May 22, 1945. W. P. MURRELL 2,376,713
BICYCLE SEAT
Filed Feb. 13, 1943
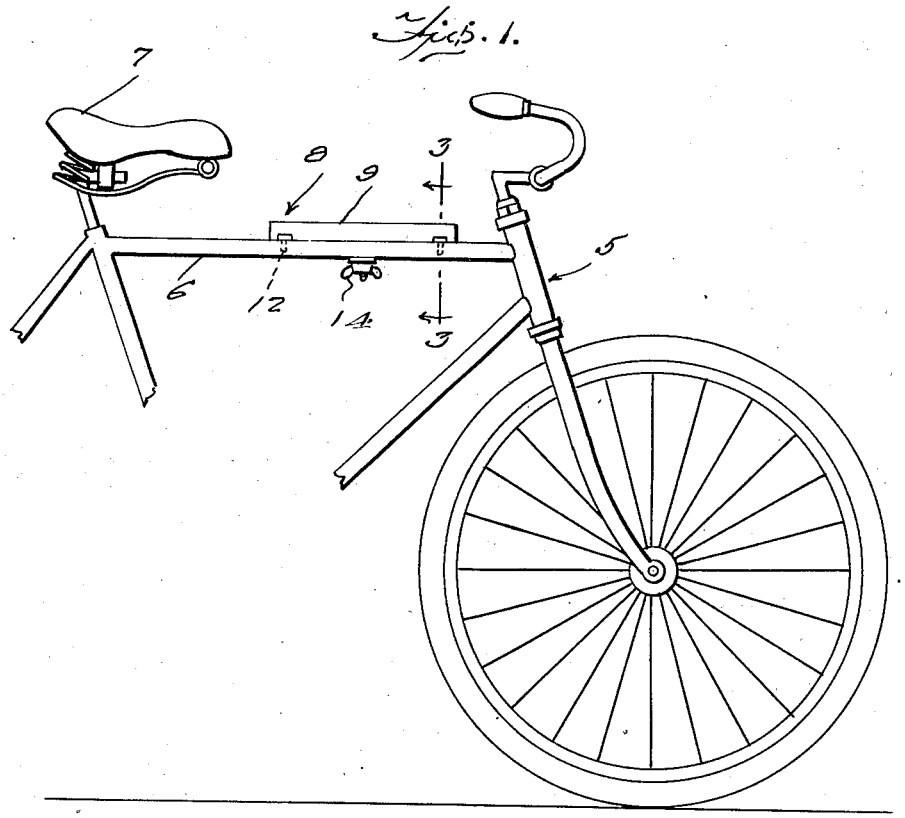
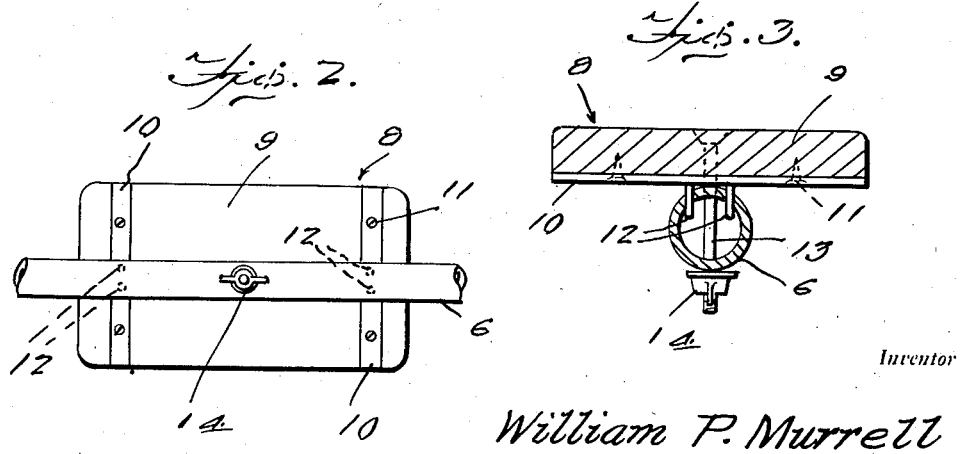
Inventor
William P. Murrell
By Clarence A. O'Brien
and Harvey B. Jacobson
Attorneys Patented May 22, 1945

2,376,713

UNITED STATES PATENT OFFICE 2,376,713

BICYCLE SEAT

William P. Murrell, Norman, Okla.

Application February 13, 1943, Serial No. 475,812

1 Claim. (Cl. 155—5.12)

This invention relates to new and useful improvements in auxiliary seats for bicycles.

The principal object of the present invention is to provide an auxiliary seat for bicycles which can be readily placed on the usual horizontal bar of a bicycle frame for the purpose of comfortably carrying a second person.

Another important object of the invention is to provide an auxiliary seat of the character stated which can be readily applied to a bicycle frame with a minimum amount of work.

Another important object of the invention is to provide an auxiliary seat for bicycles which can be manufactured at a very low cost and readily within the reach of the expenditures of children.

Other objects and advantages of the invention will become apparent to the reader of the following description.

In the drawing:

Figure 1 represents a fragmentary side elevational view of a bicycle equipped with the auxiliary seat.

Figure 2 is a fragmentary bottom plan view of the seat shown attached to the horizontal bar of a bicycle frame.

Figure 3 is an enlarged vertical sectional view taken substantially on the line 3—3 of Figure 1.

Referring to the drawing wherein like numerals designate like parts, it can be seen in Figure 1 that numeral 5 denotes a bicycle frame which includes a horizontal top bar 6. Numeral 7 denotes the usual bicycle seat.

Numeral 8 generally refers to an auxiliary seat which forms the present invention. This seat 8 may be a small rectangular-shaped board or plate 9 of any suitable material not necessarily upholstered or spring supported.

The board 9 has a pair of transversely disposed metallic strips 10 secured to the underside thereof by securing elements 11.

Depending from the intermediate portion of each of the strips 10 is a pair of pins 12.

The central portion of the board 9 is bored to receive a bolt 13.

The horizontal bar 6 is prepared by boring a hole through the bar 6 to accommodate the bolt 13 and at short spaces in opposite direction from this hole, forming openings in the top of the bar 6 to accommodate the two sets of pins 12. A wing nut 14 is provided for the bolt 13.

When the pins 11 are properly set in the small openings of the bar 6 and the bolt 13 disposed through the bar, the winged nut 14 can be applied and obviously the seat 8 will not be able to shift on the bar 6 and will provide a sturdy seat for a supplemental rider.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

In combination, a bicycle frame including a round horizontal bar having a plurality of transversely spaced openings therein and a single opening extending therethrough, a seat having pins for disposition in the first-named openings and a bolt disposed through the seat and through the second-named opening and equipped with a nut.

WILLIAM P. MURRELL.